Patented Mar. 25, 1924.

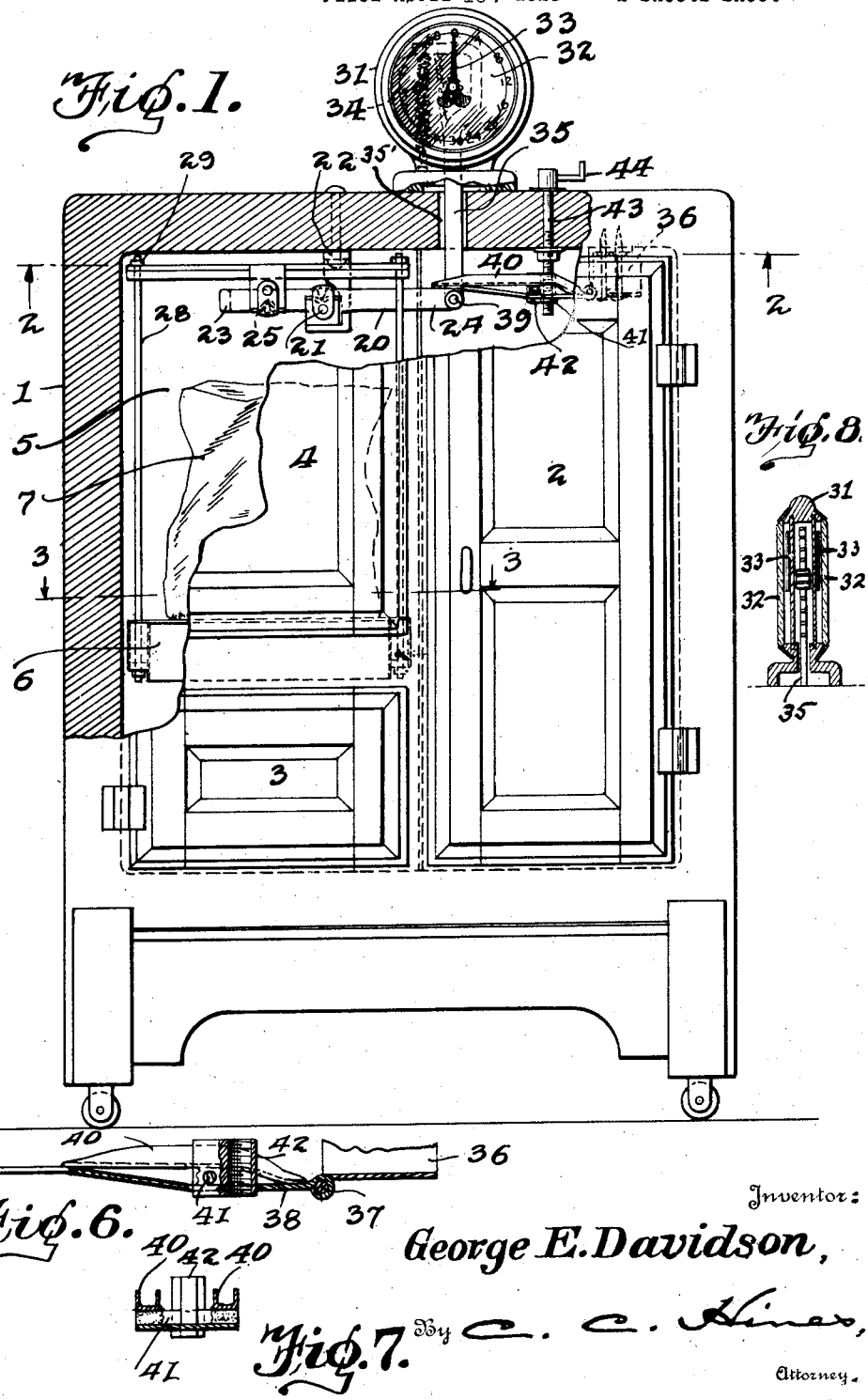

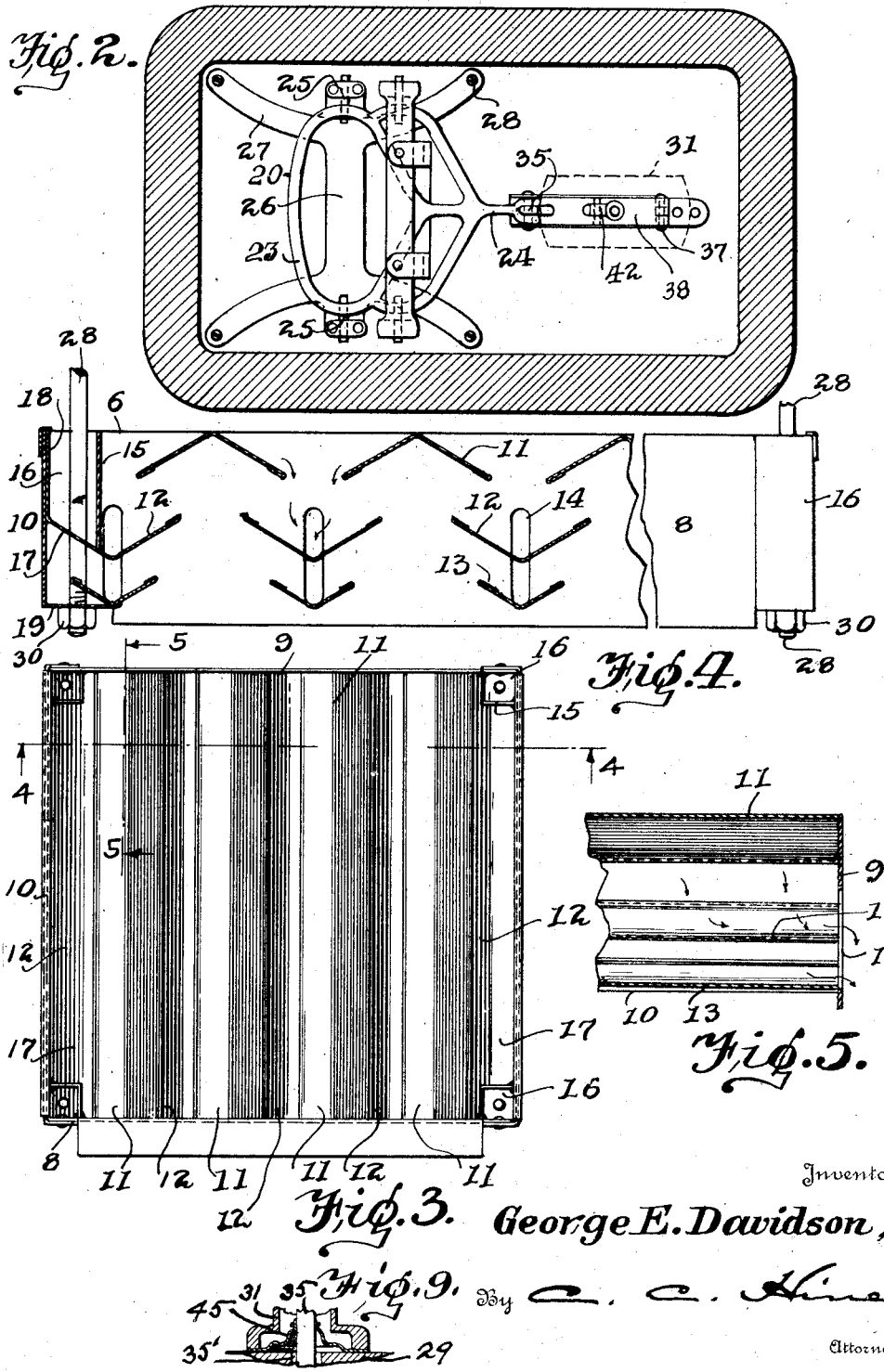

1,487,725

UNITED STATES PATENT OFFICE.

GEORGE E. DAVIDSON, OF HUNTINGTON, WEST VIRGINIA.

REFRIGERATOR.

Application filed April 16, 1923. Serial No. 632,491.

*To all whom it may concern:*

Be it known that I, GEORGE E. DAVIDSON, a citizen of the United States, residing at Huntington, in the county of Cabell and State of West Virginia, have invented new and useful Improvements in Refrigerators, of which the following is a specification.

This invention relates to improvements in refrigerators, and particularly to ice weighing attachments for refrigerators.

One object of the invention is to provide simple, reliable and efficient means for indicating, upon the exterior of the refrigerator, the amount in weight of ice contained within the ice chamber of the refrigerator, thus enabling a householder to determine with accuracy, when a purchase of ice is made, whether or not correct weight is given, and also enabling the householder to ascertain with certainty the amount of ice in pounds contained at any time in the ice chamber, without the necessity of opening the door of said chamber.

A further object of the invention is to provide a weighing attachment for refrigerators of the spring scale type which embodies means whereby the weighing mechanism may be thrown out of action whenever desired, so as to relieve the balance spring of the weight of the ice and thus reduce unnecessary wear and tear thereon, as when the scale is not in use for weighing purposes.

A still further object of the invention is to provide a weighing attachment for refrigerators which may be applied to various styles or types of refrigerators without change of form, size or construction thereof, which is compact in character and will not decrease the storage capacity of the refrigerator or interfere in any manner with the normal use of the parts thereof, and which may be installed and maintained in working operation at a comparatively low cost.

With these and other objects in view, the invention consists of the features of construction, combination and arrangement of parts, hereinafter fully described and claimed, reference being had to the accompanying drawings, in which:

Figure 1 is a front elevation, partially in section, of a refrigerator, showing the application of my invention thereto.

Figure 2 is a horizontal section on the line 2—2 of Figure 1.

Figure 3 is a top plan view of the ice tray.

Figure 4 is a vertical section on the line 4—4 of Figure 3.

Figure 5 is a vertical section on the line 5—5 of Figure 3.

Figure 6 is a vertical longitudinal section through the throw-off device.

Figure 7 is a vertical transverse section thereof.

Figure 8 is a vertical section through the body of the indicator scale.

Figure 9 is a similar section through the base of said scale.

In the illustrated embodiment of my invention I have shown a refrigerator 1 which may be of any ordinary or approved type, that disclosed having doors 2 and 3 for communication with cooling or storage compartments, and also having a door 4 for communication with an ice chamber or compartment 5. The cooling or storage compartments may be of any suitable form, size and depth and equipped with any suitable arrangement of shelves or trays to support commodities to be kept therein, a showing of which is not necessary to my invention. The ice chamber or compartment 5 may also be of any suitable form, size and depth for the purpose. It is only necessary to my invention that proper space be provided at the top of the refrigerator to accommodate certain parts of the weighing mechanism employed therein.

The ice chamber or compartment 5 herein shown is of generally rectangular form and has arranged therein a tray or rack 6 of similar outline form and adapted to support a block of ice 7 of any predetermined size or weight. The tray or rack 6 of the type disclosed comprises a rectangular sheet metal frame formed of front and rear transverse walls 8 and 9 and side walls 10, said frame being open at top and bottom as shown. Extending longitudinally between and connected with the walls 8 and 9 is an upper series of inverted V-shaped slats 11, forming a supporting surface on which the ice block 7 may rest, and extending in a similar manner between the walls 8 and 9 are other series of V-shaped slats 12 and 13. The slats 11 are spaced to provide intervening channels for the downflow of cold air and drip water into the slats 12, which form drip troughs and deflectors arranged beneath the spaces between the slats 11, and the slats 13, which are of less width than the slats 12, are disposed beneath the same to catch any drip water flowing downwardly therefrom. The intermediate and lower series of slats 12 communicate with suitable slots or passages 14 formed in one or both of the walls 8 and 9 and guide the cold air and drip water thereto, the cold air thence passing downwardly into the cooling chamber normally closed by the door 3, while the drip water is caught and conducted outwardly through any suitable type of drain device, not shown. At the four corners of the rectangular tray structure are provided L-shaped pieces 15 forming with the adjacent portions of the walls 8, 9 and 10 rectangular pockets or jacket spaces 16 which are closed at their lower ends by the outer inclined wings 17 of the outermost slats 12, which wings 17 are provided with extensions 18 lying parallel with the walls 10 and having upper end portions folded over the upper edges of the walls 10 and upon the outer sides thereof. Below the said wings 17 the walls 10 are provided, in line with the pockets 16, with inwardly projecting bracket portions 19.

Arranged within the top of the refrigerator is a scale beam 20 pivotally supported, at a point intermediate its length, as at 21, from a bracket 22 secured to and depending from the top wall of the refrigerator. This beam 20 is provided with oppositely extending arms 23 and 24, the first-named arm 23 being arranged to overlie the tray or rack 6. Pivotally mounted upon the beam arm 23, as at 25, is a supporting head or spider 26 provided with four outwardly extending arms 27. The arms 27 are perforated at their outer ends for the reception of the upper ends of suspension rods 27, which ends of the rods are threaded for the reception of retaining nuts 29. The rods 28 depend from the arms 27 down into the chamber 5 and are connected at their lower ends to the tray or rack 6, whereby said tray or rack is supported in the chamber 5 and is suspended by the four-armed head 26 from the arm 23 of the weighing beam 20. As shown the lower ends of the rods 28 pass downwardly through the jacket spaces 16 of the tray, and through perforations in the wings 17 and bracket plates 19 and are threaded at their lower ends to receive retaining nuts 30, whereby the tray or rack 6 is supported thereon. It will be observed that by this construction the lower ends of the rods are stayed and braced by the parts 17 and 19, which are properly stayed and braced from the body of the tray structure, thus forming a strong and durable connection between the tray and the rods, adapting said parts to effectually withstand all strains, shocks and jars resulting from the placing of blocks of ice upon the tray. It will furthermore be observed that the portions of the rods above the wings 17, and which lie adjacent to the ice supporting surface of the tray, are guarded and protected by being enclosed in the jacket spaces 16, the walls 15 of which further serve to connect and strengthen the walls 8 and 10 at their points of juncture, providing a strong and durable type of tray and connection of the rods therewith to adapt the same to effectually withstand rough service.

The arm 24 of the pivoted weighing beam 20 is operatively connected to a weighing scale 31 arranged upon the exterior of the refrigerator, and preferably secured upon the top thereof. This scale 31 may be of any preferred type employing an indicator dial 32, a cooperating hand or pointer 33, and a balancing spring 34. The spring 34 is suitably arranged to normally balance the weight of the scale mechanism described, including that of the tray or pan 6 when the latter is empty, and to hold the hand or pointer 31 at the zero point on the dial 32. The said spring 34 is also adapted to oppose the resulting motion of the tray 6, beam 20 and hand or pointer 31 under the weight of a body of ice or other weight placed upon the tray or platform 6, being suitably connected with the beam arm 24 and pointer 33 through the medium of a connecting bar 35 extending through opening 35′ and gearing of a type commonly employed in a spring scale 31 of the type disclosed. The bar 35 may be a rack bar whose upward motion is normally opposed by the resistance of spring 34 and whose rack teeth communicate motion to suitable gearing effecting the hand or pointer 33. I have not deemed it necessary to show in detail the construction of the spring scale mechanism 31, beyond indicating the general type which may be employed, as any spring scale mechanism of this type may be used. It is only essential to the invention that a proper type of spring scale mechanism be employed which will oppose resistance to the motion of the connecting member 35 and upward movement of the beam arm 24 when the beam arm 23 is drawn downward under the weight of a body of ice placed upon the tray 6, the parts of the scale mechanism being returned to normal position by the weight of scale arm 24 and that of the bar 25 by the weight of such parts in conjunction with the force of spring 34 opposing that under which it resists the downward motion of the tray or rack 6.

It will thus be understood that when a block or cake of ice 7 is inserted into compartment 5 and upon the tray 6, the downward movement of the weight of said tray, which will be transmitted to the head 26, will result in a downward pull upon arm 23 of beam 20, as a result of which the arm 24 of said beam will be raised. In this operation the bar 35 will be elevated against the resistance of the spring 34, which will alloy the tray 6 to descend to a greater or less degree dependent upon the weight of the ice supported thereon, the movement of said bar 35 causing a resultant allowed degree of movement to the hand or pointer 33 which will traverse the dial 32 and indicate thereon the weight of the ice placed upon the tray or rack 6. Thus the householder may, whenever furnished with ice by a dealer, be able to tell by a glance at the scale pointer and dial whether the amount of ice furnished is the correct amount for which payment is made. Also, as long as the scale mechanism is in order for weighing action, the weight of the body of ice on the tray 6 will be indicated by the pointer 33, allowing the householder to ascertain at a glance just how much ice is contained in the refrigerator at any time without the necessity of opening the door 4. As the ice melts and decreases in volume, it will of course be understood that through reaction the spring 34 shifts the connecting bar 35 downwardly and thereby, through the action of the beam 20, raises the tray 6 to a greater or less degree, the hand or pointer 33 in this operation moving backwardly on the dial to an equivalent extent to indicate the reduction in weight. It will also be observed that the rods 28 are arranged so as to occupy extreme marginal portions of the chamber 5, while the beam 20 and associated parts of the weighing mechanism are arranged at an elevated point in the refrigerator in compact shape so as to occupy comparatively small space. As a result of this arrangement of the internal parts and location of the spring weighing scale upon the exterior of the refrigerator, the indicating mechanism will not only be always visible but the contained parts of the weighing mechanism will be arranged so that they will not interfere with the normal use of the interior of the regfrigerator or take up any undue amount of storage space. It will be apparent, furthermore, from the foregoing description, that a type of weighing mechanism is provided which may have an adequate range of weighing action for any of the sizes of refrigerators in common use, and yet which is of simple construction and capable of being readily installed and maintained in working condition at a comparatively low cost.

I provide a stop or throw-off device whereby the weighing mechanism may be held rigid against motion whenever desired, as when a weight indicating action is not necessary, so as to normally relieve the spring 34 of the strain of the weight of the ice, etc., and thereby enable it to be kept in good condition for long and reliable service. This stop or throw-off device comprises a bracket 36 secured to the underside of the top wall of the refrigerator casing, to which bracket is hinged or pivoted, as at 37, one end of a movable stop arm 38, bifurcated at its opposite end to straddle the bar 35 and to provide spaced arms lying in the path of movement of the pivotal connection 39 between said bar and the lever 20. This arm is strengthened by bowed reinforcing strips 40 secured thereto, said strips being arranged to bear against lugs 41 formed on the arm, the arm and strips being reversely bowed and the strips channeled to withstand the weight of a block of considerable size, when the stop device is thrown into action. Fixed to the arm is a nut 42 engaged by a screw shaft 43 journaled in suitable bearings in the top wall of the refrigerator and terminating at its upper end in an actuating handle 44 whereby said shaft may be turned or rotated in reverse directions. By this construction it will be seen that the stop may be swung upwardly and out of the path of movement of the pivot bolt 39, when it is desired to allow the scale mechanism to function, while on the contrary, the stop device may be adjusted downwardly into the path of the bolt 39, as shown in Figure 1, to arrest the movement of the beam 20, whenever desired. When the motion of the beam 20 is thus arrested, the strain of the weight of the body of ice will be removed from the spring scale mechanism and the weighing mechanism held rigidly from movement, as will be readily understood.

As stated, the indicator scale may be of any preferred type employing an indicator dial 32, a cooperating hand or pointer 33, and a balancing spring 34. I, however, prefer to employ a double-faced dial indicator having at each side a dial 32 and pointer 33, which are duplicates of each other and cooperate with the same balancing spring 34. This permits either side of the scale to face outward, or the scale indications to be viewed from front and rear simultaneously, or from opposite sides of the refrigerator, according to arrangements, and provides further a reversible scale which may be used for right or left hand indication. I also provide means for preventing the cold air from passing from the refrigerator to the interior of the scale through the opening 35' in the top of the refrigerator and causing condensation and deposit of moisture in the scale body and upon the dials. Such means comprises a diaphragm 45 of rubber or other suitable flexible impervious material marginally clamped between the top of the refrigerator and the rim portion of the base of the indicator stand or casing. At its center the diaphragm 45 is perforated for passage of the rod 35 but is secured to said rod for movement therewith and in such manner as to prevent leakage of air at the point where the rod passes through it. This diaphragm closes the base of the indicator casing against the passage of cold air or moisture from the refrigerator through the opening 35' to the indicator casing. The indicator dials and mechanism are thus protected against the access thereto of cold air which would cause condensation and the deposit of moisture liable to cause the parts to rust or become discolored or vapor to be deposited on the glass panels covering the dials and obscuring the latter, as will be readily understood.

Having thus fully described my invention, I claim:—

1. In a refrigerator, the combination of a casing having an ice compartment, an ice supporting tray vertically movable in said compartment, a spring controlled scale indicator upon the exterior of the refrigerator and secured thereto, a supporting head within the refrigerator, suspending means connecting the ice supporting tray with the supporting head, and a beam pivotally supported within the refrigerator and having oppositely projecting arms, one of said arms being pivotally coupled to the head and the other to the spring controlled scale indicator.

2. In a refrigerator, the combination of a casing having an ice compartment, an ice supporting tray of rectangular form vertically movable in said compartment, a spring controlled scale indicator mounted upon the exterior of and secured to the refrigerator, a four-armed supporting head arranged within the refrigerator casing, rods connecting the arms of said head with the four corners of the ice supporting tray, and a beam pivotally mounted within the refrigerator and having oppositely extending arms, one of said arms being pivotally coupled to the supporting head and the other arm coupled to said spring controlled scale indicator.

3. In a refrigerator, the combination of a casing having an ice compartment, a supporting head arranged within the refrigerator casing and having four outwardly extending arms, an ice supporting tray vertically movable within the ice compartment and having enclosed portions at the corners thereof separate from its ice supporting surface, rods connected at their upper ends to the four arms of the head and depending therefrom and extending downwardly through the enclosed portions at the corners of the tray and secured to the latter, a spring controlled scale indicator secured to the upper side of the top wall of the refrigerator, a pivotally mounted beam within the refrigerator having oppositely extending arms, a pivotal connection between one of said arms and the supporting head, and a scale actuating rod coupled to the other arm of the beam and to the spring controlled scale indicator mechanism.

4. In a refrigerator, the combination of a refrigerator casing having an ice compartment, a four-armed supporting head mounted in said compartment below said head, suspending rods connected to the four arms of the head and to the corner portions of the ice supporting tray and suspending the latter from the former, a horizontally disposed beam pivotally mounted in the top of the refrigerator and having oppositely extending arms, a pivotal connection between one of said arms and the supporting head, a spring controlled scale indicator mechanism mounted upon the top of the refrigerator, and an actuating bar pivotally coupled to the other arm of the beam and extending outwardly through the top of the refrigerator and operatively connected to said spring controlled scale indicator mechanism.

5. In a refrigerator, the combination of a refrigerator casing having an ice compartment, an ice supporting tray vertically movable in said compartment, a spring controlled scale indicating mechanism upon the top of the refrigerator, scale beam mechanism arranged within the refrigerator and supporting the tray and coupled to said spring controlled indicating mechanism, a stop device movable into and out of the path of movement of said beam, a nut associated with said stop device, and a screw shaft for actuating the nut to transmit motion to said stop device.

6. The combination of a refrigerator having an ice chamber and provided with an opening in one of its walls, a scale platform in said chamber, a scale beam connected therewith, an indicator including a casing having a hollow base portion secured upon the exterior of said wall, a rod extending through the opening in the wall and connecting the scale beam with the indicator mechanism, and a flexible diaphragm arranged in the hollow base of the indicator casing and secured to and movable with the rod, said diaphragm operating to cover the opening and prevent the passage of cold air from the refrigerator to the indicator casing.

In testimony whereof I affix my signature.

GEORGE E. DAVIDSON.